(12) United States Patent
Perrin et al.

(10) Patent No.: US 11,783,718 B2
(45) Date of Patent: Oct. 10, 2023

(54) ENHANCED FLIGHT VISION SYSTEM FOR AN AIRCRAFT

(71) Applicant: Airbus Operations SAS, Toulouse (FR)

(72) Inventors: Aymeric Perrin, Toulouse (FR); Jerome Gouillou, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 327 days.

(21) Appl. No.: 17/333,567

(22) Filed: May 28, 2021

(65) Prior Publication Data
US 2021/0383709 A1    Dec. 9, 2021

(30) Foreign Application Priority Data

Jun. 4, 2020 (FR) .................................. 2005854

(51) Int. Cl.
*G08G 5/02* (2006.01)
*B64D 45/08* (2006.01)
*G08G 5/00* (2006.01)

(52) U.S. Cl.
CPC ............. *G08G 5/025* (2013.01); *B64D 45/08* (2013.01); *G08G 5/0021* (2013.01); *G08G 5/0073* (2013.01)

(58) Field of Classification Search
CPC .... G08G 5/025; G08G 5/0021; G08G 5/0073; B64D 45/08; B64D 45/04; B64D 43/00; G05D 1/0676
See application file for complete search history.

(56) References Cited

U.S. PATENT DOCUMENTS

| 5,608,392 A | 3/1997 | Faivre et al. |
| 8,116,923 B2 | 2/2012 | Ishihara et al. |
| 2010/0231705 A1* | 9/2010 | Yahav ..................... G02B 27/01 348/E7.091 |
| 2013/0050485 A1* | 2/2013 | Tiana ..................... G06T 7/0002 348/148 |
| 2015/0081143 A1 | 3/2015 | Snow et al. |
| 2016/0035080 A1 | 2/2016 | O'Dell et al. |
| 2016/0046386 A1 | 2/2016 | Eberle |
| 2020/0116521 A1* | 4/2020 | Barber .................. G01C 23/005 |
| 2020/0168111 A1 | 5/2020 | Veyrac et al. |
| 2020/0355518 A1* | 11/2020 | Bilek ..................... G01C 23/00 |
| 2021/0383705 A1* | 12/2021 | Perrin .................... B64D 45/08 |

OTHER PUBLICATIONS

French Search Report; priority document.

* cited by examiner

*Primary Examiner* — Donald J Wallace
(74) *Attorney, Agent, or Firm* — Greer, Burns & Crain, Ltd.

(57) ABSTRACT

An enhanced flight vision system for an aircraft includes an image acquisition system configured to acquire images of the surroundings outside the aircraft and a display system configured to receive images produced by the image acquisition system and to display these images on a display in the cockpit of the aircraft. The display system is configured to acquire information about the flight path angle of the aircraft when approaching a runway, to calculate a difference between the flight path angle of the aircraft and a nominal angle and to deactivate the display of the images received from the image acquisition system on the display when the absolute value of the difference is greater than a first angular value.

9 Claims, 3 Drawing Sheets

ENHANCED FLIGHT VISION SYSTEM FOR AN AIRCRAFT

CROSS-REFERENCES TO RELATED APPLICATIONS

This application claims the benefit of the French patent application No. 2005854 filed on Jun. 4, 2020, the entire disclosures of which are incorporated herein by way of reference.

FIELD OF THE INVENTION

The invention relates to the field of displays in aircraft cockpits.

BACKGROUND OF THE INVENTION

Some aircraft have an enhanced flight vision system EFVS. Such an EFVS system generally comprises a display system in the cockpit of the aircraft, configured so as to allow information to be displayed on a display such that this information is visible to a pilot of the aircraft in a manner superimposed on surroundings outside the aircraft. The EFVS system also comprises an image acquisition system, comprising at least one image sensor and designed to acquire images of the surroundings outside the aircraft. The display system is configured so as to receive images produced by the image acquisition system and to display these images on the display. The display is, for example, a head-up display, generally called HUD, or a display designed to be mounted on the head of a user, generally called HMD ("head-mounted display"). The image sensor is preferably designed to capture images in a wavelength region comprising wavelengths invisible to the human eye, for example infrared or radar wavelengths. Since these images are displayed on the display in a manner superimposed on the surroundings outside the aircraft, the EFVS system thus allows a member of the flight crew using the system (for example a pilot) to have enhanced vision of the external surroundings. This is useful, in particular, at night or in the case of fog. The EFVS system, for example, gives the pilot a better view of a runway in spite of the night-time conditions or fog during a phase of approaching the runway.

The EFVS system was initially used by pilots as an aid for allowing them to enhance their perception of the surroundings outside the aircraft, but the regulations in force did not allow use thereof as a single visual source for making an approach towards a runway or for landing on this runway. Thus, apart from the case of what is called an "all-weather" landing, the pilot of an aircraft making an approach towards a runway has to see the runway (without using the EFVS system) when he or she has descended to a predetermined altitude, called decision altitude. If he or she cannot see the runway, the pilot has to perform a go-around. For some time now, it has been possible to use the EFVS system so as to allow a pilot to make a decision to continue an approach towards a runway when he or she reaches the decision altitude, and then to guide the aircraft to the runway and perform the landing, on the basis solely of the images displayed by the EFVS system. The pilot may thus continue an approach towards the runway in spite of poor visibility conditions, for example in the case of fog. This thus allows the aircraft to land on a runway in spite of poor visibility conditions, even if the airport is not equipped with a system designed to allow all-weather landing. Minimum visibility conditions however remain a requirement in the context of these operations, in order in particular to limit impacts in case of error with the vision system.

In order for the images produced by the EFVS system to be able to be used by a pilot so as to make the decision to land on a runway without any restriction in terms of the external visibility conditions, and then to guide the aircraft non-automatically to the runway, the probability of failure of the EFVS system should be low enough not to risk causing a situation considered to be catastrophic. In this respect, aircraft certification authorities require this probability to be less than or equal to $1 \times 10\text{-}9$. In this respect, the quality assurance level of the EFVS system would have to be of the type DAL A (DAL for "Design Assurance Level"), in accordance with the classification defined in the document Eurocae ED-79A/SAE ARP 4754A. The quality assurance level of the display system in the cockpit generally is of the type DAL-A. By contrast, the quality assurance level of the image acquisition system is not of the type DAL-A, but rather of the type DAL-B or even DAL-C. As a result, the quality assurance level of the EFVS system comprising the display system in the cockpit and the image acquisition system is not of the type DAL-A. However, it would be extremely expensive to develop an image acquisition system of the type DAL-A.

The inventors have analyzed the potential risks in case of failure of the image acquisition system of the EFVS system. The main risk, when approaching a runway, is a risk of the images that the image acquisition system supplies to the display system of the EFVS system being offset. This offset risk concerns both a spatial (vertical or lateral) offset and a temporal offset. Specifically, in the case of a downward offset in the image displayed on the display, the pilot is led to command the aircraft to dive downward in order to be able to land on the runway, whereas this command to dive downward is not necessary. Thus, in the case of an excessive downward offset in the image, this could result in a risk of the aircraft colliding with the ground, in particular when the aircraft is flying at low altitude. An excessive temporal offset between a time of acquisition of an image by the image acquisition system and a time of displaying of this image on the display could, under some circumstances, lead to the same result. Specifically, the display on the display is then no longer consistent with the current attitude of the aircraft. In particular, when the pilot commands an increase in the descent angle of the aircraft, the effect of the command is displayed on the display with a delay, which may lead the pilot to strengthen the dive command, whereas this was not necessary. This could result in a risk of the aircraft colliding with the ground, in particular when the aircraft is flying at low altitude.

SUMMARY OF THE INVENTION

The present invention aims, in particular, to provide a solution to this problem. It relates to an enhanced flight vision system comprising:
   a display system for an aircraft cockpit, configured to allow information to be displayed on a display such that this information is visible to a pilot of the aircraft in a manner superimposed on surroundings outside the aircraft; and
   an image acquisition system configured to acquire images of the surroundings outside the aircraft,
   wherein the display system is configured so as to receive images produced by the image acquisition system and to display these images on the display, characterized in that the display system is configured so as to:
  acquire information about the flight path angle of the aircraft when the aircraft is approaching a runway;
  calculate a difference between the flight path angle of the aircraft and a nominal angle corresponding to the approach towards the runway; and
  compare the absolute value of the difference with a first angular value and deactivate the display of the images received from the image acquisition system on the display when the absolute value of the difference is greater than the first angular value.

The enhanced flight vision system according to the invention thus makes it possible to detect the consequences of a downward offset in the images displayed on the display, specifically an excessive dive order commanded by a pilot of the aircraft, leading to a flight path angle of the aircraft that is too great with respect to the nominal angle corresponding to the approach under consideration. In such a case, the enhanced flight vision system deactivates the display of the images on the display. This makes it possible to stop displaying images that could lead the pilot to command inappropriate piloting orders, for example an excessive dive command Deactivating the display of the images on the display means that the pilot has to check whether he or she has direct visibility of the runway through the windscreen and, if not, to implement procedures provided for in such circumstances. For example, the pilot knows that, in the absence of visibility of the runway through the windscreen of the aircraft when he or she descends to an altitude called the decision altitude, he or she has to perform a go-around. The enhanced flight vision system thus makes it possible to guarantee the flying safety of the aircraft, even if it is used when approaching a runway.

Advantageously, the display system is furthermore configured so as to command the display of an alert on the display when the absolute value of the difference is greater than the first angular value.

In one embodiment, the display system is furthermore configured so as to compare the absolute value of the difference with a second angular value less than the first angular value and command the display of pre-alert information on the display when the absolute value of the difference is greater than the second angular value and less than the first angular value.

Advantageously, the display system is furthermore configured so as to determine the first angular value as corresponding to an increasing function of the current height of the aircraft above the ground.

Again advantageously, the display system is furthermore configured so as to determine the second angular value as corresponding to an increasing function of the current height of the aircraft above the ground.

In one particular embodiment, the display system is furthermore configured so as to command the display of information corresponding to the second angular value on the display.

In particular, the display system is furthermore configured so as to use, as value of the nominal angle corresponding to the approach towards the runway, a nominal angle value published for this approach towards the runway.

The invention also relates to a display method in a cockpit of an aircraft comprising an enhanced flight vision system that comprises:
  a display system configured so as to allow information to be displayed on a display in the cockpit, such that this information is visible to a pilot of the aircraft in a manner superimposed on surroundings outside the aircraft; and
  an image acquisition system designed to acquire images of the surroundings outside the aircraft,
the method comprising a step, implemented by the display system, of receiving images produced by the image acquisition system and of displaying the images on the display, characterized in that the method furthermore comprises the following steps implemented by the display system:
  acquiring information about the flight path angle of the aircraft when the aircraft is approaching a runway;
  calculating a difference between the flight path angle of the aircraft and a nominal angle corresponding to the approach towards the runway; and
  comparing the absolute value of the difference with a first angular value and deactivating the display of the images received from the image acquisition system on the display when the absolute value of the difference is greater than the first angular value.

The invention also relates to an aircraft comprising an enhanced flight vision system as mentioned above.

BRIEF DESCRIPTION OF THE DRAWINGS

The invention will be better understood on reading the following description and on examining the appended figures.

DETAILED DESCRIPTION OF THE PREFERRED EMBODIMENTS

Figure 1:
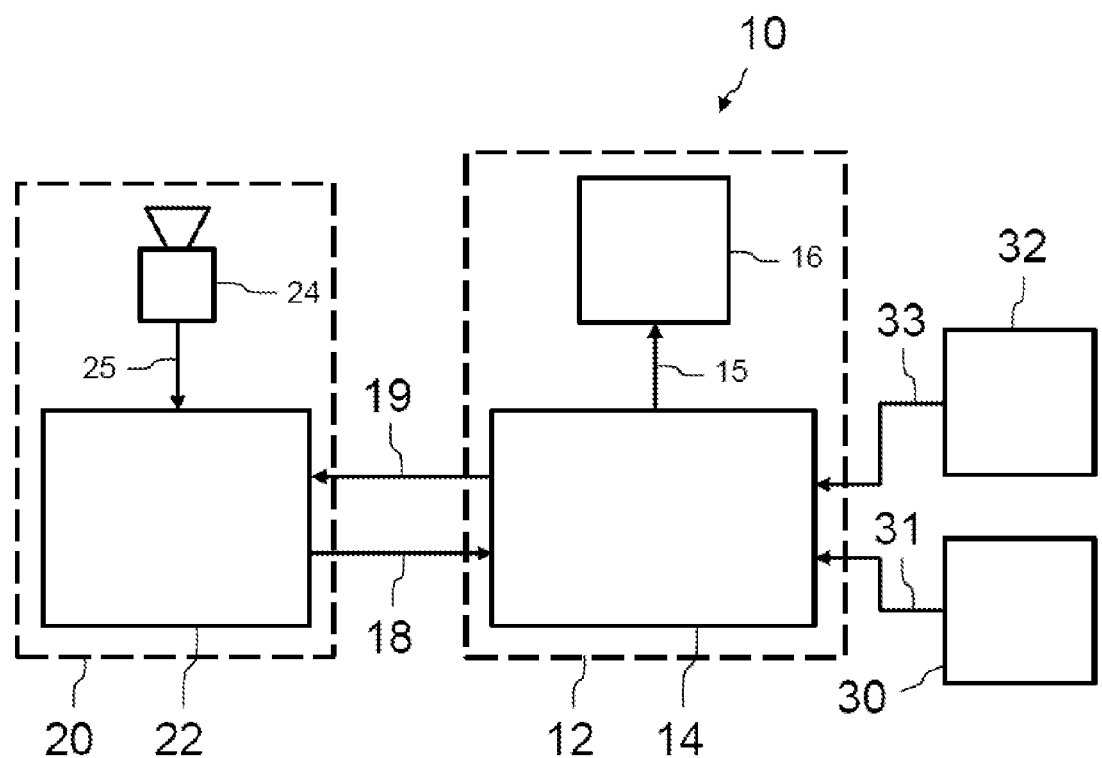
FIG. 1 schematically illustrates an enhanced flight vision system according to the invention.
Figure 5:
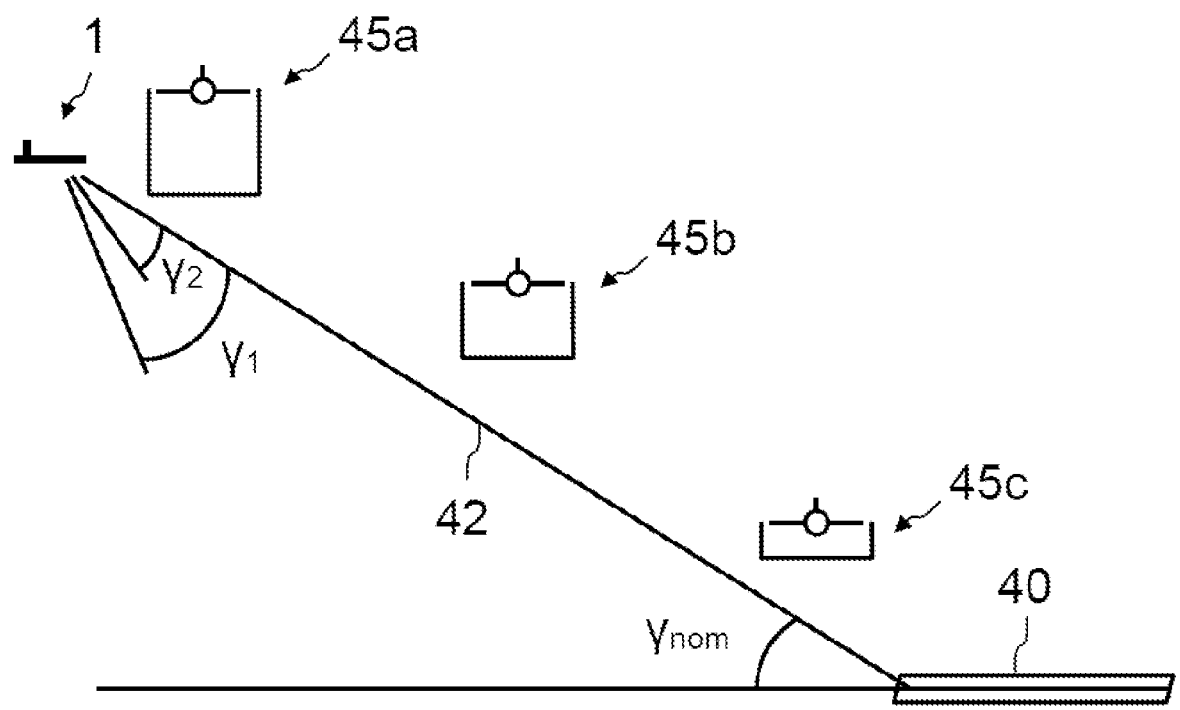
FIG. 5 illustrates one example of a symbol designed to be displayed, according to one embodiment of the invention, on a screen in the cockpit of an aircraft when the aircraft is approaching a runway.
Figure 6:
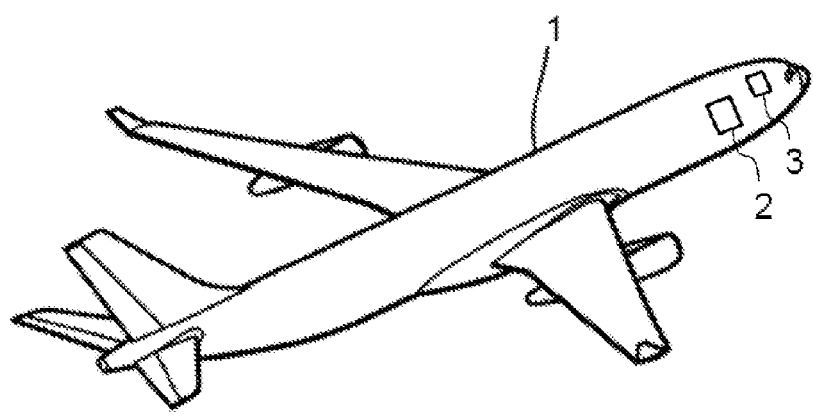
FIG. 6 illustrates an aircraft comprising an enhanced flight vision system.

The enhanced flight vision system 10 shown in FIG. 1 comprises a display system 12 for an aircraft cockpit, an image acquisition system 20, and a communication link 18 from the image acquisition system 20 to the display system 12. The display system 12 comprises a processing unit 14, a display 16, and a link 15 from the processing unit 14 to the display 16. The image acquisition system 20 comprises a processing unit 22, an image source 24, and a link 25 from the image source 24 to the processing unit 22. The image source 24 corresponds, for example, to an infrared camera. The enhanced flight vision system 10 is designed to be installed on an aircraft, such as the aircraft 1 shown in FIG. 5. The display 16 is then installed in a cockpit 3 of the aircraft. This display corresponds, for example, to a head-up display (HUD) or a display intended to be mounted on the head of a user, such as a pilot of the aircraft. The processing units 14 and 22 are, for example, installed in an avionics bay 2 of the aircraft. The image source 24 is arranged so as to be able to acquire images of surroundings of the aircraft potentially visible to a pilot of the aircraft through a windscreen of the cockpit 3. The processing unit 14 of the enhanced flight vision system 10 is connected at an input, via a link 31, to an information source 30 able to supply a nominal angle corresponding to an approach towards the runway. The information source 30 corresponds, for example, to a flight management computer FMS ("flight management system") of the aircraft. The processing unit 14 of the enhanced flight vision system 10 is also connected at an input, via a link 33, to an information source 32 able to supply information about the flight path angle of the aircraft. The information source 32 corresponds, for example, to a flight control computer of the aircraft.

During operation, the image source 24 acquires images of the surroundings outside the aircraft, and it transmits these images to the processing unit 22 of the image acquisition system 20 via the link 25. The processing unit 22 receives these images and transmits them to the processing unit 14 of the display system 12. The processing unit 14 of the display system 12 receives these images produced by the image acquisition system 20 and accordingly controls the display on the display 16 via the link 15, such that the images displayed on the display 16 are visible to a pilot of the aircraft in a manner superimposed on and matching the surroundings outside the aircraft (called congruent vision).

Figure 2:
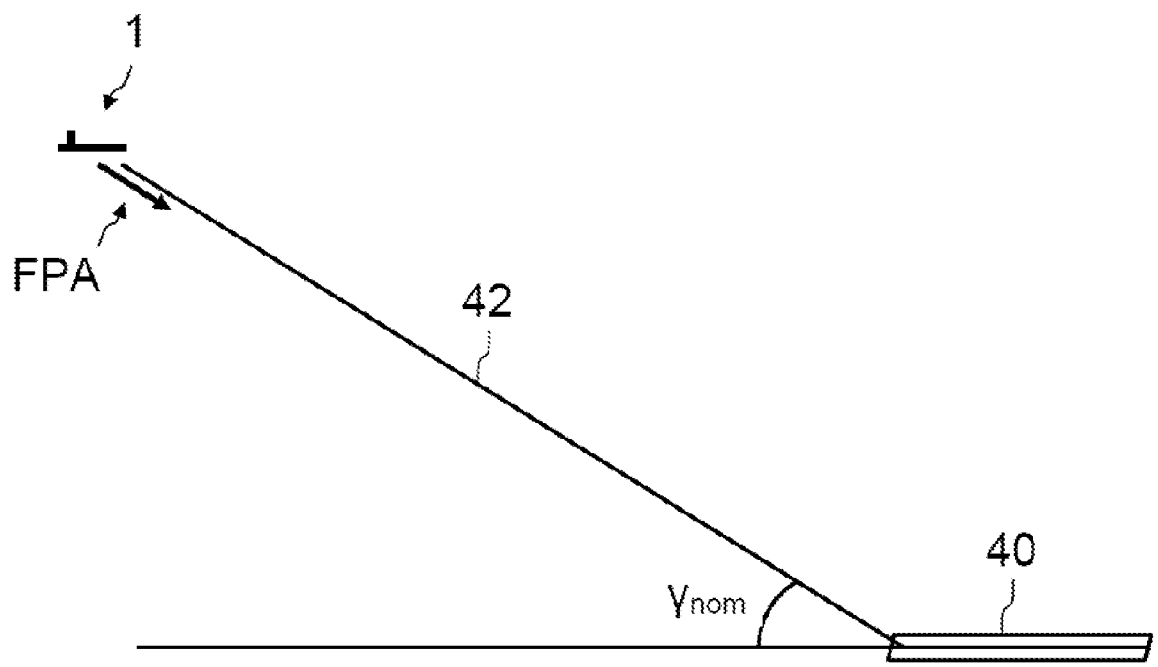
FIG. 2 illustrates a first situation of an aircraft approaching a runway.
Figure 3:
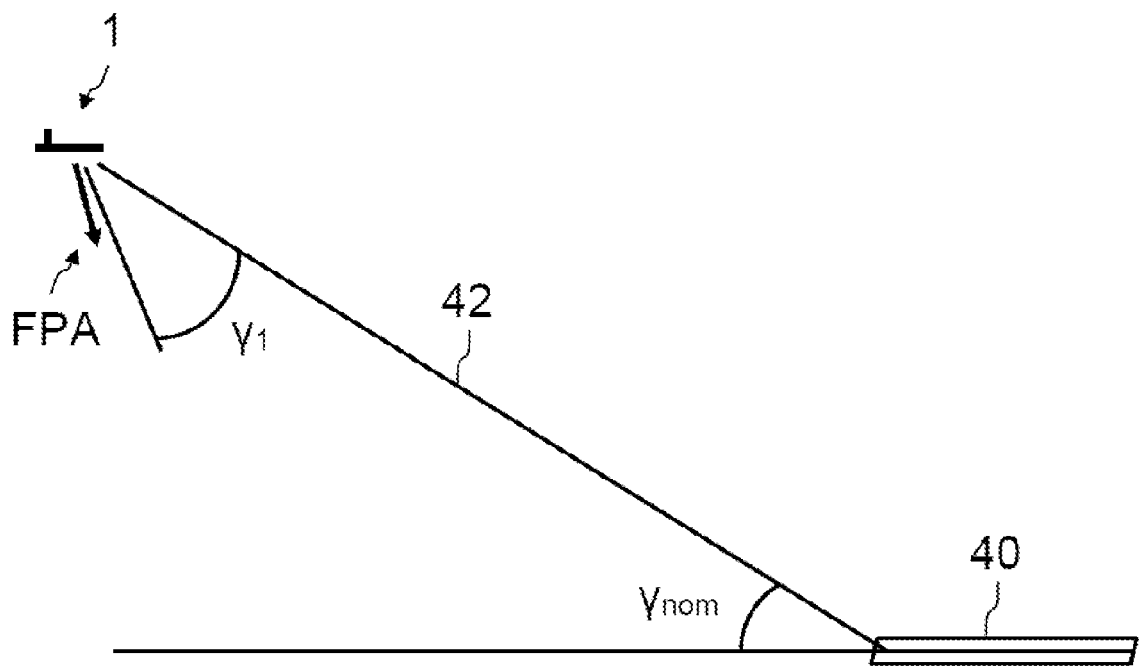
FIG. 3 illustrates a second situation of an aircraft approaching a runway.

According to the invention, as illustrated in FIG. 2, when the aircraft 1 is approaching a runway 40, the processing unit 14 of the display system 12 acquires FPA ("flight path angle") information about the flight path angle of the aircraft, from the information source 32, via the link 33. The processing unit 14 also acquires, from the information source 30, via the link 31, a nominal angle γnom corresponding to an approach axis 42 of the approach towards the runway. This nominal angle information corresponds, for example, to an angle published for the approach under consideration towards the runway. The processing unit 14 calculates a difference between the flight path angle FPA of the aircraft and the nominal angle γnom corresponding to the approach towards the runway. The processing unit 14 then compares the absolute value of the difference with a first angular value γ1, and it deactivates the display of the images received from the image acquisition system 20 on the display 16 when the absolute value of the difference is greater than the first angular value γ1, as illustrated in FIG. 3. Thus, when the flight path angle FPA of the aircraft is too great, in particular due to a defect with the image acquisition system 20, the display system 12 deactivates the display of the images on the display 16. The pilot of the aircraft is then no longer able to use these images to pilot the aircraft. The pilot is thus no longer misled. Owing to the procedures in force, he or she then has to check whether he or she is able to see the runway through the windscreen of the aircraft. If so, he or she may continue the approach. If not, in the absence of visibility of the runway below a predetermined altitude, called decision altitude, the pilot has to command a go-around of the aircraft. The enhanced flight vision system 10 according to the invention thus makes it possible to guarantee the safety of the aircraft, even if it is used when approaching a runway.

Advantageously, when the absolute value of the difference is greater than the first angular value γ1, the processing unit 14 of the display system 12 furthermore commands the display of an alert on the display 16 so as to signal the excessive approach angle FPA to the pilot.

Figure 4:
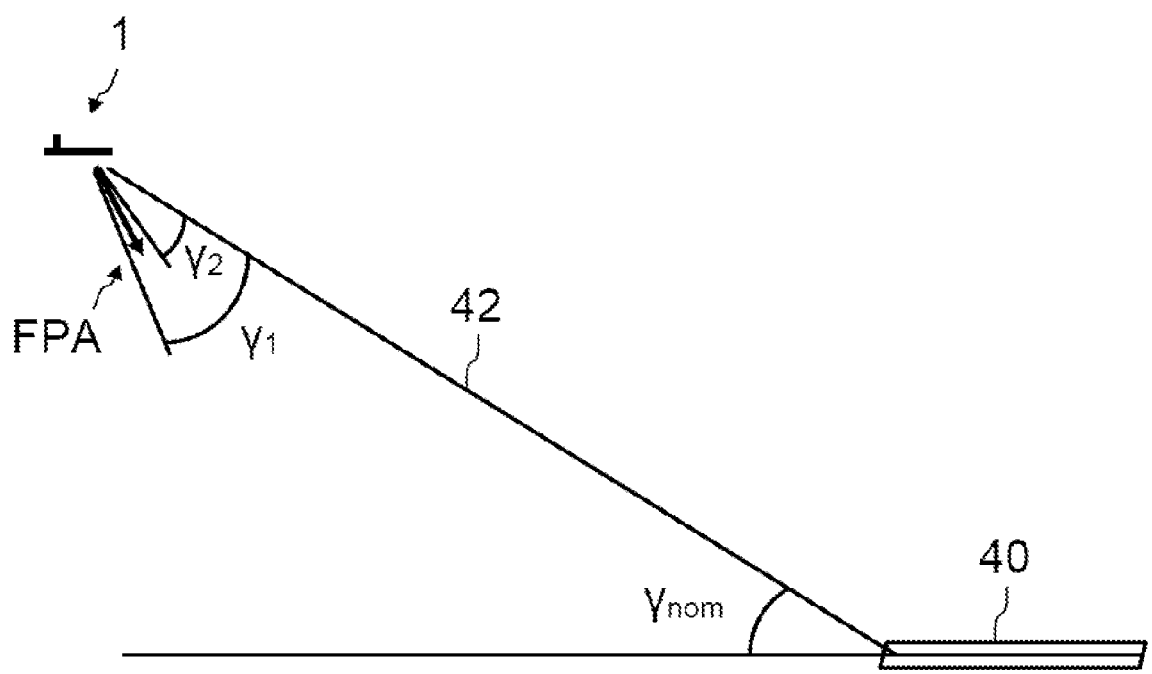
FIG. 4 illustrates a third situation of an aircraft approaching a runway.

In one particular embodiment, the processing unit 14 furthermore compares the absolute value of the difference with a second angular value γ2 less than the first angular value γ1, as illustrated in FIG. 4. When the absolute value of the difference is greater than the second angular value γ2 and less than the first angular value γ1, the processing unit 14 commands the display of pre-alert information on the display 16. This makes it possible to attract the pilot's attention to a risk of an excessive flight path angle FPA for the approach under consideration.

Advantageously, the first angular value γ1 is determined as corresponding to an increasing function of the current height of the aircraft above the ground. The value of γ1 is thus at a maximum at the start of approach and it decreases during the approach to a minimum value when the aircraft arrives close to the threshold of the runway 40. This makes it possible to reduce the tolerance in relation to the difference between the nominal angle γnom corresponding to the approach under consideration, on the one hand, and the flight path angle FPA of the aircraft, on the other hand, when the aircraft is approaching the ground. Specifically, for the same angular difference of the flight path angle FPA of the aircraft, the risk of the aircraft colliding with the ground becomes greater the smaller the height of the aircraft above the ground. Reducing the tolerance thus makes it possible to reduce the risk of the aircraft colliding with the ground. According to a first alternative, the value of γ1 is determined by the processing unit 14 of the display system 12. According to other alternatives, the value of γ1 is determined by other computers on board the aircraft, for example a flight management computer 30 or a flight control computer 32, and then transmitted to the processing unit 14 of the display system 12.

Again advantageously, the second angular value γ2 is determined as corresponding to an increasing function of the current height of the aircraft above the ground. The value of γ2 is thus at a maximum at the start of approach and it decreases during the approach to a minimum value when the aircraft arrives close to the threshold of the runway 40. The advantages are similar to those described in the previous paragraph for the first angular value γ1.

In one particular embodiment, the processing unit 14 of the display system 12 furthermore commands the display of information corresponding to the second angular value γ2 on the display 16. This allows the pilot of the aircraft to take note of the current tolerance between the nominal angle γnom corresponding to the approach under consideration, on the one hand, and the flight path angle FPA of the aircraft, on the other hand. This information corresponding to the second angular value γ2 is, for example, shown in the form of a symbol, such as one of the symbols 45a, 45b and 45c illustrated in FIG. 5. Each of the symbols comprises a symbolic depiction of the aircraft in the upper part and a U-shape surmounted by the symbolic depiction of the aircraft in the lower part. The height of the U-shape decreases when the tolerance decreases. This height is thus at a maximum for the symbol 45a at the start of approach, and then it decreases to a minimum height for the symbol 45c at the end of approach, passing through an intermediate height for the symbol 45b in the middle of approach.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characters or steps and in any order unless the disclosure or context suggests otherwise. This disclosure hereby incorporates by reference the complete disclosure of any patent or application from which it claims benefit or priority.

The invention claimed is:

1. An enhanced flight vision system comprising:
a display system for a cockpit of an aircraft, configured to allow information to be displayed on a display such that this information is visible to a pilot of the aircraft in a manner superimposed on surroundings outside the aircraft; and
an image acquisition system configured to acquire images of the surroundings outside the aircraft,
wherein the display system is configured to receive images produced by the image acquisition system and to display these images on the display,
wherein the display system is configured so as to:
acquire information about the flight path angle of the aircraft when the aircraft is approaching a runway;
calculate a difference between a flight path angle of the aircraft and a nominal angle corresponding to said approach towards the runway; and
compare an absolute value of said difference with a first angular value and deactivate the display of the images received from the image acquisition system on the display when the absolute value of the difference is greater than the first angular value.

2. The enhanced flight vision system according to claim 1, wherein the display system is furthermore configured to command the display of an alert on the display when the absolute value of the difference is greater than the first angular value.

3. The enhanced flight vision system according to claim 1, wherein the display system is furthermore configured to determine the first angular value as corresponding to an increasing function of a current height of the aircraft above ground.

4. The enhanced flight vision system according to claim 1, wherein the display system is furthermore configured to compare the absolute value of said difference with a second angular value less than the first angular value and command the display of pre-alert information on the display when the absolute value of the difference is greater than the second angular value and less than the first angular value.

5. The enhanced flight vision system according to claim 4, wherein the display system is furthermore configured to determine the second angular value as corresponding to an increasing function of a current height of the aircraft above ground.

6. The enhanced flight vision system according to claim 4, wherein the display system is furthermore configured to command the display of information corresponding to the second angular value on the display.

7. The enhanced flight vision system according to claim 1, wherein the display system is furthermore configured to use, as value of the nominal angle corresponding to the approach towards the runway, a nominal angle value published for this approach towards the runway.

8. A display method in a cockpit of an aircraft comprising an enhanced flight vision system that comprises:
a display system configured to allow information to be displayed on a display in the cockpit, such that this information is visible to a pilot of the aircraft in a manner superimposed on surroundings outside the aircraft; and
an image acquisition system configured to acquire images of the surroundings outside the aircraft,
the method comprising the following steps implemented by the display system:
receiving images produced by the image acquisition system,
displaying said images on the display,
acquiring information about a flight path angle of the aircraft when the aircraft is approaching a runway;
calculating a difference between the flight path angle of the aircraft and a nominal angle corresponding to said approach towards the runway; and
comparing an absolute value of said difference with a first angular value and deactivating the display of the images received from the image acquisition system on the display when the absolute value of the difference is greater than the first angular value.

9. An aircraft comprising an enhanced flight vision system according to claim 1.

* * * * *